United States Patent [19]

Toyoda

[11] Patent Number: 4,671,637
[45] Date of Patent: Jun. 9, 1987

[54] ELECTROMAGNETICALLY CONTROLLED SHUTTER FOR CAMERA

[75] Inventor: Yasuhiro Toyoda, Kanagawa, Japan

[73] Assignees: Canon Kabushiki Kaisha, Tokyo; Canon Denshi Kabushiki Kaisha, Saitama, both of Japan

[21] Appl. No.: 887,376

[22] Filed: Jul. 17, 1986

[30] Foreign Application Priority Data

Jul. 19, 1985 [JP] Japan .......................... 60-110855[U]

[51] Int. Cl.⁴ ............................. G03B 9/08; G03B 9/40
[52] U.S. Cl. .................................... 354/234.1; 354/246
[58] Field of Search ........... 354/234.1, 235.1, 246-249

[56] References Cited

U.S. PATENT DOCUMENTS 4,364,654 12/1982 Senuma et al. .................. 354/234.1
4,487,492 12/1984 Toyoda et al. ................... 354/234.1

Primary Examiner—A. A. Mathews
Attorney, Agent, or Firm—Toren, McGeady & Associates

[57] ABSTRACT

A shutter for camera having a shutter controlling mechanism including an armature and an electromagnet in which starting of operation of a shutter-curtain is controlled by operation of separating the armature from the electromagnet, which includes an armature lever for actuating said armature and having a bearing rotatably mounted around a supporting shaft, an armature separating spring for applying a force to said armature lever to separate said armature from said electromagnet, said armature separating spring being arranged around a guide formed by the peripheral surface of said bearing, and a collar interposed between the armature separating spring and the peripheral surface of the bearing, said collar being made of molded plastic material having small friction to a metallic material.

7 Claims, 6 Drawing Figures

ELECTROMAGNETICALLY CONTROLLED SHUTTER FOR CAMERA

BACKGROUND OF THE INVENTION

1. Field of the Invention

The present invention relates to a shutter for camera having a shutter controlling mechanism including an armature and an electromagnet in which starting of operation of a shutter-curtain is controlled by separating the armature from the electromagnet.

2. Description of the Related Art

Firstly, a description will be given to an example of a conventional focal-plane shutter of the type wherein its exposure time is controlled by operation of separating an armature from a combination magnet, with reference to FIGS. 4–6.

In FIGS. 4–6, 1 designates a shutter base plate having an aperture 1a in its substantially central portion. 2 designates a cover plate attached to said base plate at a predetermined distance therefrom, which has an aperture (not shown) at the position corresponding to that of said aperture 1a. A leading shutter-curtain 3 and a trailing shutter-curtain (not shown) are disposed between said base plate 1 and said cover plate 2, and these shutter curtains serve to open or close the apertures by means of a link mechanism which is well known in the art.

A leading curtain driving device A and a trailing curtain driving device B for driving said leading and trailing shutter curtains are arranged on the base plate 1. The mechanism of the leading curtain driving device A is completely same as that of the trailing curtain driving device, and only difference resides in timing of starting the operation of the shutter-curtains. Therefore, a detailed description will be given to only the leading curtain driving device A.

The leading curtain driving device A includes a curtain driving lever 4 having a pin 4a connected to a link mechanism, which is well known in the art. The curtain driving lever 4 serves to open and close the leading curtain 3 when it is rotated around a shaft θ. A curtain driving spring 5 is arranged around the shaft θ and it constitutes an energy source for driving the leading curtain.

A curtain locking lever 6 engages at its bent portion 6a with a hook portion 4a of the curtain driving lever 4 to lock said driving lever 4 at a position for preparing the start of operation. Said curtain locking lever 6, when rotated in the clockwise direction around a shaft Q, unlocks said curtain driving lever 4, so that the leading curtain 3 starts its operation.

A magnet supporting plate 7 is arranged above the base plate 1 and an electromagnet and armature lever mechanism for controlling the exposure time is supported thereon. This mechanism includes a combination magnet 8 for controlling the leading shutter-curtain, which consists of a permanent magnet 9, yokes 11 and armature coils 12. This combination magnet normally acts to attract an armature 10 to the yokes 11 under the action of the permanet magnet 9. When a current is fed to the armature coils 12, a magnetic flux is produced thereby in the direction opposite to that produced by said permanent magnet 9, so that the magnetic force of the permanent magnet 9 is cancelled out and thus the armature 10 becomes separable.

An armature lever 13 is connected at its forward end to said armature. The armature lever 13, which requires high mechanical strength and high precision, is made of metal. The armature lever 13 has a bearing 16 rotatably mounted around a shaft S. An armature separating spring 14 for separating the armature 10 from the combination magnet 8 is arranged around said shaft S and said armature separating spring 14 charges its spring force by the charging operation applied by a separating force applying lever 15 which is associated with a charging lever (not shown), to produce a force to separate said armature. The armature lever 13 is rotatably supported at its bearing portion 16 on the shaft S which stands on the magnet supporting plate 7. An armature returning spring 17 is connected to said armature lever 13 to return the armature 10, which has been once separated from the magnet by the action of the current applied to the armature coils 12, to its original position where the armature is attracted to the magnet.

Now, the operation of the above-mentioned focal-plane shutter will be described.

FIG. 4 shows the shutter in charged state. The armature lever 13 connected to the armature 10 receives a force tending to rotate said lever in the clockwise direction (FIG. 5) around the shaft S under the action of the spring force of the armature separating spring 14, while said armature is held in its position where it is attracted to the combination magnet 8 under the action of the magnetic force of the permanent magnet 9.

If a current is applied to the armature coils 12 of the combination magnet 8 for controlling the leading shutter-curtains, the magnetic field produced by the pernament magnet 9 is decreased by the action of the opposite magnetic field produced by the electromagnet formed by the armature coils 12, and when the magnetic attracting force becomes weaker than the spring force of the armature separating spring 14, the armature 10 is released from the attracted state and the armature lever 13 starts its rotation in the clockwise direction around the shaft S.

Then, the armature lever 13 strikes against a bent portion 6b of the locking lever 6 to cause said locking lever 6 to rotate in the clockwise direction around the shaft Q, and thus the driving lever 4 is unlocked, so that it starts to operate the leading curtain.

The trailing curtain driving device B starts its operation at a predetermined time after the leading curtain driving device A has started its operation. The device B operates in the same manner as in the leading curtain driving device A to operate the trailing shutter-curtain and the exposure operation is completed.

After the armature lever 13 has unlocked the driving lever 4, the armature lever 13 is returned, by the action of the returning spring 17, to its original position, where the armature 10 is again attracted to the yokes 11.

In the focal-plane shutter of the type wherein the combination magnet 8 consisting of the combination of the permanent magnet 9 and the electromagnetic coils 12 is used and the exposure time is controlled by the operation of separating the armature 10, as explained above, the spring 14 for applying the separating force to the armature lever 14 is so arranged that it is wound around the guide formed by the peripheral surface of the bearing 16 of the armature lever 13.

Such an arrangement, however, presents problems as described below.

Recently, the shutter speed tends to be considerably increased, for example, to 1/4000 second at the time of usual photographing or 1/250 second at the time of synchronized photographing and, consequently, the speed of the shutter curtain tends to be considerably increased. Accordingly, the spring for driving the shutter-curtains requires increased spring force, so that the energy required to unlock the shutter-curtain which has been locked before starting operation is also increased.

Under such circumstances, in case of the shutter of the combination-magnet controlled type wherein the energy for unlocking the curtain driving lever depends upon the force of the armature separating spring 14, the increase of the energy required to unlock the shutter-curtains results in increase of the spring force of the armature separating spring, so that the load and the striking force applied to the armature lever at the time of unlocking the driving lever is particularly increased. Thus, there may occur several inconvenices, such as decrease of the precision of the exposure time owing to deformation of the lever, destruction of the lever or the like.

There may occur a further inconvenience. Since it is difficult to make the armature lever by molded plastic material, it is necessary to make the armature lever of iron or other metallic material having sufficient mechanical strength. If the armature lever is made of metallic material, the bearing 16 made of metallic material must be fixed to the armature lever 13 by caulking and the peripheral surface of said bearing 16 forms the guide surface for the armature separating spring 14, so that at the time of operation there occurs metal-to-metal sliding contact between the bearing 16 and the spring, as indicated by the arrows in FIG. 6. Such metal-to-metal sliding contact tends to increase the friction between the spring and the bearing and prevent the smooth operation of the spring, so that the spring force becomes unstable. Accordingly, the timing of separation of the armature and the timing of unlocking of the shutter-curtains after separation of the armature may become irregular, with the result the exposure time may be adversely effected thereby, that is, the shutter exposure time may become irregular.

Although it may be considered that such friction between the spring and the bearing can be decreased by applying lubricant oil to the sliding contact area, the lubricant oil applied may enter into the attracted surfaces of the armature and the yokes of the combination magnet which are positioned near the sliding contact area to which the lubricant oil was applied. The lubricant oil which entered into the attracted surfaces of the armature and the yokes may adhere the armature and the yokes together, with the danger that the armature cannot separate from the magnet even if a current was fed to the electromagnetic coils of the combination magnet.

SUMMARY OF THE INVENTION

It is an object of the present invention to provide a shutter for camera in which the precision of the exposure time can be improved.

In accordance with the present invention there is provided a shutter for camera having a shutter controlling mechanism including an armature and an electromagnetic coil in which attraction and separation of the armature to and from the electromagnetic coil are changed over by controlling feeding of current to said electromagnetic coil and starting of operation of a shutter-curtain is controlled by the separation of said armature from the electromagnet, which comprises an armature lever connected to said armature and having a bearing rotatably supported around a supporting shaft, a collar made of molded plastic material and disposed around said bearing of said armature lever positioned on the periphery of said supporting shaft, and an armature separating spring mounted around said collar for applying an energizing force to said armature lever in the direction to separate said armature from the electromagnetic coil.

DETAILED DESCRIPTION OF THE PREFERRED EMBODIMENTS

Now, the preferred embodiments of the present invention will be described, with reference to FIGS. 1-3.

Figure 1:
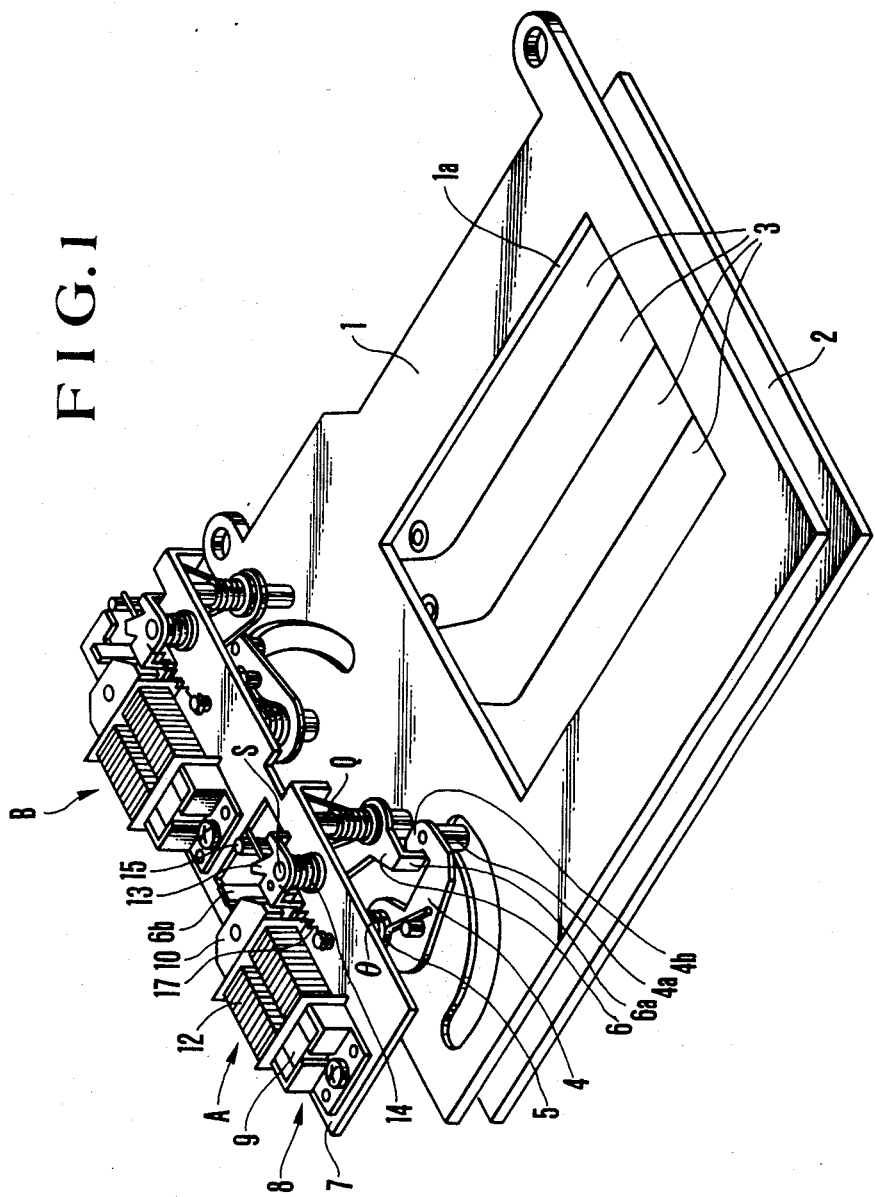
FIG. 1 is a perspective view showing an embodiment of the shutter according to the present invention.

FIG. 1 is a perspective view showing a shutter according to the present invention, in the state where the charging has been completed. The shutter shown in FIG. 1 includes several parts which are same as those of the conventional shutter shown in FIG. 4. These parts are indicated by the same symbols as used in FIG. 4 and the detailed descriptions of these parts are omitted in the explanation of FIG. 1.

Figure 2:
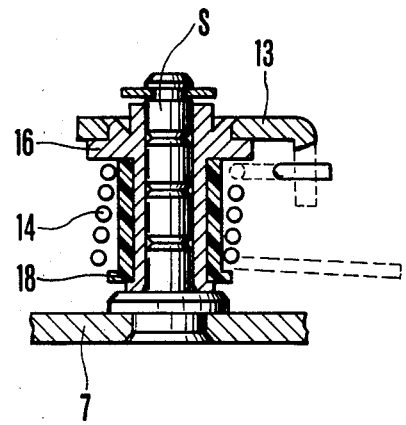
FIG. 2 is a sectional view showing a bearing portion of an armature lever shown in FIG. 1.

As shown in FIG. 2, the armature lever 13 for actuating the armature 10 is attached to the bearing 16, which is rotatably mounted on the shaft S. The bearing 16 is made of lead phospher bronze (PbPBB) or the like. Between the bearing 16 and the armature separating spring 14 is arranged a collar 18 made of molded plastic material having small friction to metallic material (which is hereinafter referred to as "molded collar"). This molded collar 18 having good slipping property interposed between the bearing 16 and the armature separating spring 14 is press-fitted onto the peripheral surface of the bearing 16 and serves to decrease the friction during operation of the spring 14 for separating the armature.

Figure 4:
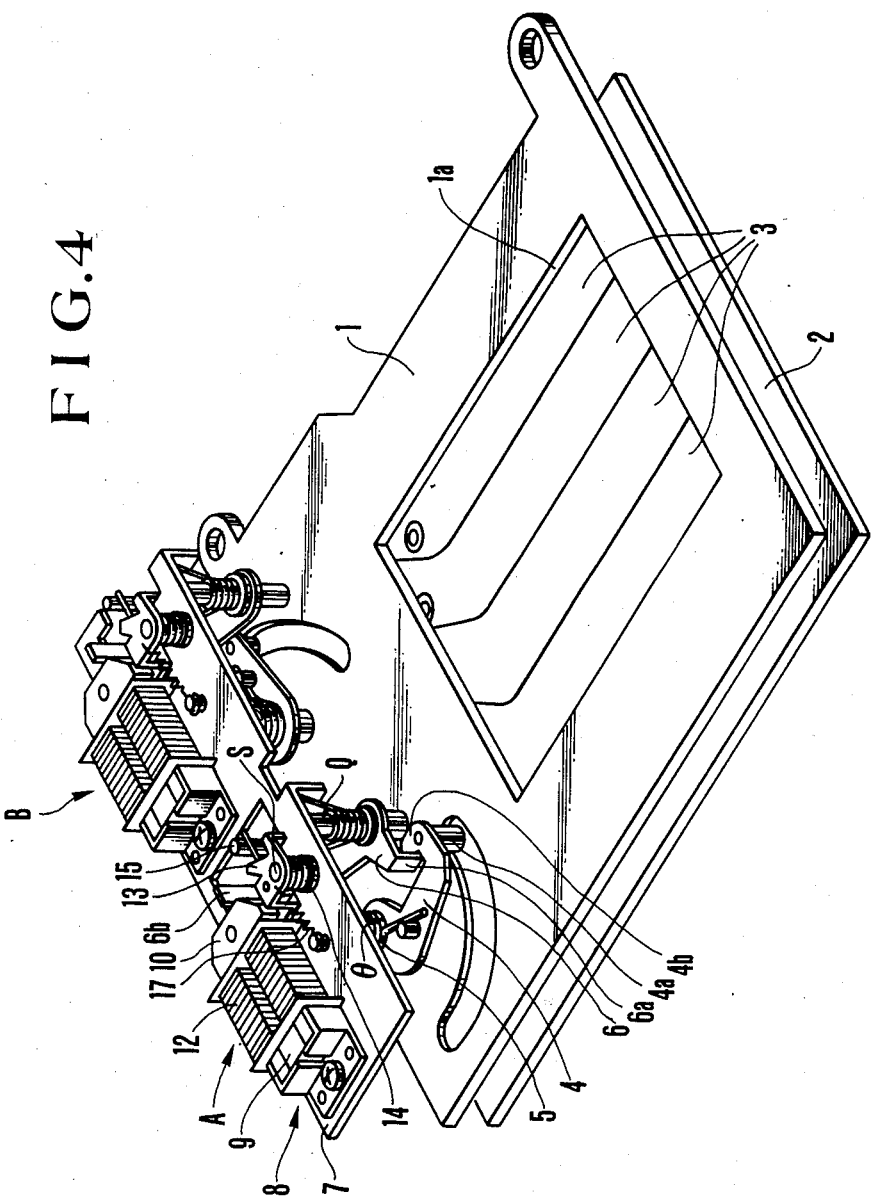
FIG. 4 is a perspective view showing a shutter according to a prior art.
Figure 5:
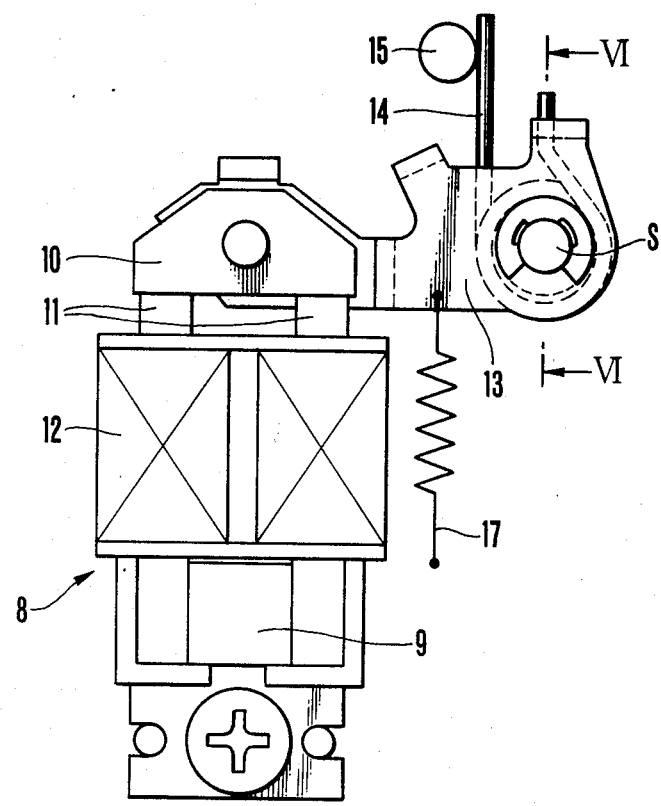
FIG. 5 is a plan showing a combination magnet and an armature lever shown in FIG. 4.
Figure 6:
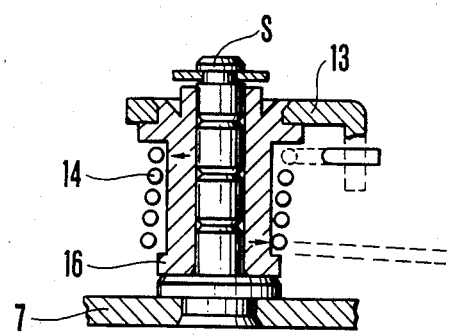
FIG. 6 is a sectional view showing a bearing portion of an armature lever shown in FIG. 6.

The operation of the focal-plane shutter as shown in FIG. 1 is substantially same as that described with reference to FIG. 4. In FIG. 1 the shutter is held in its charged state. The armature lever 13 receives a rotating force to rotate said lever in the clockwise direction around the shaft S under the action of the armature separating spring 14, while said lever is held in its position where the armature is attracted to the combination magnet 8 for controlling the the leading curtains by the action of the permanent magnet 9. When a current is fed through the armature coils 12 of the combination magnet 8, the magnetic field produced by the permanent magnet 9 is weakened by the opposite magnetic field produced by said coils 12, and when the attracting force is lowered below the spring force of the armature separating spring 14 the armature 10 is released from its attracted position and the armature lever 13 starts its rotation in the clockwise direction around the shaft S.

Then, the armature lever 13 strikes against the bent portion 6b of the locking lever 6 and rotates it in the clockwise direction. Thus the driving lever 4 is unlocked and causes the leading curtain 3 to start its operation.

In this regard it is noted that the process of operation from the separation of the armature 10 to the unlocking of the driving lever 4, has most important influence on the precision of the exposure time of the shutter. In other words, the precision of the exposure time is largely influenced by the effectiveness and the manner of operation of the spring 14 for separating the armature. According to the present invention, the molded collar 18 having good slipping property is interposed between the bearing 16 and the armature separating spring 14, as shown in FIG. 2, to improve the effectiveness and the manner of operation of said spring 14.

The trailing curtain driving device B starts its operation at a predetermined time after the leading curtain driving device A has started its operation. The device B operates in the same manner as in the leading curtain driving device A to operate the trailing shutter-curtain and the exposure operation is completed.

Figure 3:
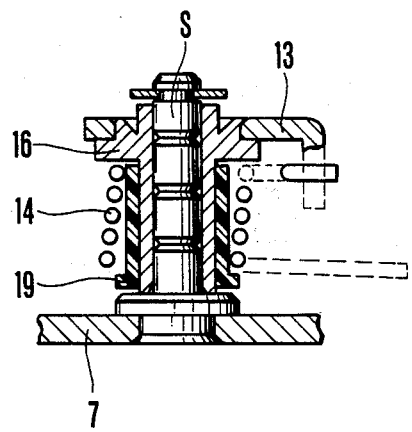
FIG. 3 is a sectional view showing a modification of the bearing portion shown in FIG. 2.

FIG. 3 illustrates a modification of the bearing portion of the armature lever. As compared with the embodiment shown in FIG. 2 in which the molded collar 18 is press-fitted on the peripheral surface of the bearing 16 of the armature lever 13, a molded collar 19 according to the modification as shown in FIG. 3 is rotatably fitted on the peripheral surface of the bearing 16. According to this modification, the slipping between the molded collar 19 and the armature separating spring 14 is partly undertaken by the rotation of the molded collar 19 relative to the collar 16, whereby the friction between the spring 14 and the bearing is further decreased. Of course, an oilless molded collar can be used as the molded collar as explained above.

It will be understood from the above explanation that the present invention provides a shutter for camera which has advantages as described below.

Owing to the provision of the molded collar having good slipping property interposed between the armature separating spring mode of metal and the armature lever bearing mode of metal which forms the guide for said armature separating spring, the metal-to-metal sliding contact is avoided and the smooth action of the armature separating spring is assured due to the easily slipping contact between the metallic spring and the molded material. Accordingly, the cause of producing unstable action of the spring force is eliminated and the precision of the exposure time is considerably improved. Thus, the present invention provides a shutter for camera which can be adapted to a high speed exposure time, for example 1/4000 sec. Furthermore, the area between the armature separating spring and the bearing of the armature lever requires no lubricant oil or a very small amount of lubricant oil, if any, and, consequently, there is no danger of the lubricant oil entering into the attracted surfaces of the armature and the yoke, to adhere them together. Accordingly the worst case where even if a current is fed to the armature coil the armature cannot be separated and the shutter-curtain cannot operate is avoided.

What is claimed is:

1. A shutter for camera including an electromagnet for controlling a shutter, an armature and an electromagnetic coil in which attraction and separation of the armature to and from the electromagnetic coil are changed over by controlling feeding of current to said electromagnetic coil and starting of operation of a shutter-curtain is controlled by a relative movement of said armature with respect to the electromagnet, comprising:
   (a) an armature lever connected to said armature and having a bearing portion rotatably supported around a supporting shaft;
   (b) a collar made of molded plastic material and disposed around said bearing portion of said armature lever positioned on the periphery of said supporting shaft; and
   (c) an armature separating spring mounted around said collar for applying an energizing force to said armature lever in the direction to separate said armature.

2. A shutter according to claim 1, wherein said supporting shaft is made of metal.

3. A shutter according to claim 1, wherein said collar is press-fitted around the bearing portion of said armature lever.

4. A shutter according to claim 1, wherein said collar is rotatably fitted around the bearing portion of said armature lever.

5. A shutter according to claim 1, wherein said collar is made of oilless molded material.

6. A shutter according to claim 1, said armature separating spring is a coil spring.

7. A shutter according to claim 1, wherein the starting of operation of the shutter-curtain is controlled by the separation of said armature from the electromagnet.

* * * * *